NOISE CONTROLLED SOUND REPRODUCING SYSTEM

INVENTOR
ABRAHAM B. COHEN
BY
Burgess, Dinklage & Sprung
ATTORNEYS.

INVENTOR
BY ABRAHAM B. COHEN
Burgess, Dinklage & Sprung
ATTORNEYS.

INVENTOR
ABRAHAM B. COHEN
BY
Burgess, Dinklage & Sprung
ATTORNEYS.

NOISE CONTROLLED SOUND REPRODUCING SYSTEM

Filed March 25, 1965 5 Sheets-Sheet 4

INVENTOR
ABRAHAM B. COHEN
BY
Burgess, Dinklage & Sprung
ATTORNEYS.

INVENTOR
ABRAHAM B. COHEN
BY
Burgess, Dinklage & Sprung
ATTORNEYS.

United States Patent Office 3,410,958

Patented Nov. 12, 1968

3,410,958

NOISE CONTROLLED SOUND REPRODUCING SYSTEM

Abraham B. Cohen, Oklahoma City, Okla., assignor to Executone Inc., Long Island City, N.Y., a corporation of New York Filed Mar. 25, 1965, Ser. No. 442,688

6 Claims. (Cl. 179—1)

ABSTRACT OF THE DISCLOSURE

The transmission channel is made responsive to ambient noise at the loudspeaker by sensing the noise, amplifying it, and using the amplified signal to vary the resistance of a photocell thereby changing the gain of the amplifier in the transmission channel. Feedback is eliminated by switching off the noise sensing channel during transmission while maintaining its most recent level as a control voltage.

This invention relates in general to sound reproducing and distributing systems such as are used for public address and intercommunication between remote areas, and more particularly to an improved sound system wherein the audio output level is controlled in response to noise level sensed at listening areas such that the level of sounds reproduced thereat is maintained at a predetermined decibel increment above the noise level, regardless of fluctuations in the noise level. In addition, the sound system according to the invention permits the same loudspeakers as are used for sound reproduction to be used for noise level sensing, by an appropriate switching arrangement, so as to provide better correlation between the controlled audio output and noise.

Essentially, the sound system of the invention utilizes a variable attenuator which is responsive to noise signals to vary the attenuation between an audio signal source and an audio amplifier which drives the loudspeakers. This variable attenuator has a continuous attenuation characteristic which decreases with increasing noise level so that the loudspeaker output is maintained at a selected level above the ambient noise level.

In contrast to prior art noise controlled sound systems which used stepwise adjustable attenuations in combination with relay controlled switching networks to provide discrete audio output levels corresponding to fixed quantized noise levels, the attenuator element of the invention by reason of its continuous attenuation characteristic provides theoretically infinite noise control resolution, and thus dispenses with the prior art relay switching networks and the problems arising from the limitations of quantized control systems.

For example, to cover a typical range of ambient noise in a busy factory above 60 decibels, which corresponds to a quiet office area, a relatively large number of attenuation steps is required in such prior art systems, since the noise in such a factory can be as high as 90 decibels. In such systems, the number of attenuation steps is dependent upon the largest noise level increment, or step, which can be tolerated without raising the audio output. For instance, if an increase of 5 decibels in noise level could be tolerated before switching to the next attenuation step, then 6 attenuation steps would be required to cover the 30 decibel range between the quiet office reference of 60 decibels and the 90 decibels of noise anticipated in the factory. A step of 5 db (decibels) is rather large, because for an increase in noise level by a factor of two, there is only a 3 db increase in sound pressure. Therefore, with a stepwise attenuator responsive only to 5 db noise increments, the audio output could hardly follow a changing noise level at a specified level above it. In order to provide a 3 db incremental response in such an attenuator, ten attenuation switching steps would have to be provided. Thus, it can easily be seen that it is impractical from the viewpoint of cost and complexity to provide a stepwise adjustable attenuator which can follow a changing noise level closely.

Furthermore, prior art noise controlled sound systems used microphones, usually a single microphone placed in a given listening area, for sensing the noise level thereat. Where the reproduced sound is distributed over a large area, a single microphone is generally inadequate for sensing the noise level to be used as a basis for controlling loudspeaker output, because in such large areas the ambient noise can vary from point to point over a wide range. Ideally, a microphone should be provided for each of several locations in the listening area, or at least one microphone for every loudspeaker should be provided.

The problems of providing sufficient noise sensing coverage are solved in the sound system of the invention by using the loudspeakers as noise level sampling sensors. In an electro-dynamic device such as a loudspeaker, the conversion of acoustic energy to electrical energy is reversible, such that when subjected to sound or audible noise, a loudspeaker generates an electrical signal corresponding thereo. In the invention, this phenomenon is utilized through a switching arrangement which connects the loudspeaker terminals to appropriate amplifying means for controlling an attenuator in response to the noise level sensed by the loudspeaker, in the absence of sound transmission, and preferably prior thereto, and then after the proper attenuation factor has been set, the loudspeaker is connected to the output of an audio amplifier for sound transmission.

In the embodiment of the invention which uses loudspeakers for performing the dual function of noise sensing and sound distribution, it is necessary that each function be performed alternately, since obviously they cannot be performed simultaneously. Accordingly, the switching arrangement is so constructed that when the loudspeakers are not being used for sound reproduction, they are sensing noise level, and during periods of noise sensing, the attenuator is continuously controlled so as to provide an audio attenuation factor which corresponds to the instantaneous noise level. When it is desired to switch over the loudspeakers to their sound reproduction function, a memory device, such as a capacitor, causes the attenuator to retain the attenuation factor corresponding to the most recent noise level during the period of sound transmission.

By using a sound controlled switching device such as a voice-controlled microphone, an improved attenuator control can be realized, since with each pause in sound transmission, it will be supplied with updated noise level information.

The sound system of the invention, by reason of its unique mode of attenuator control, is adaptable to multiple speaker installations wherein all speakers can simultaneously sense the noise at their respective locations and generate electrical signals corresponding thereto which are mixed through a common input transformer to produce a single electrical signal correlated with the noise levels existing throughout an extended listening area.

It is therefore, an object of the invention to provide a noise controlled sound system which is responsive to noise level in a listening area to control the level of sound reproduced thereat such that the sound level is greater than the noise level.

Another object of the invention is to provide a sound system as aforesaid wherein the sound output level is automatically maintained at a predetermined level above that of the noise.

Another and further object of the invention is to provide a sound system as aforesaid wherein the same loudspeakers as are used for sound reproduction are also used for noise sensing.

Still another object of the invention is to provide in the aforesaid sound systems means for controlling the sound output in close time correlation to sensed noise.

Other and further objects and advantages of the invention will appear in, or become evident from the following detatiled description and accompanying drawings in which.

Figure 1:
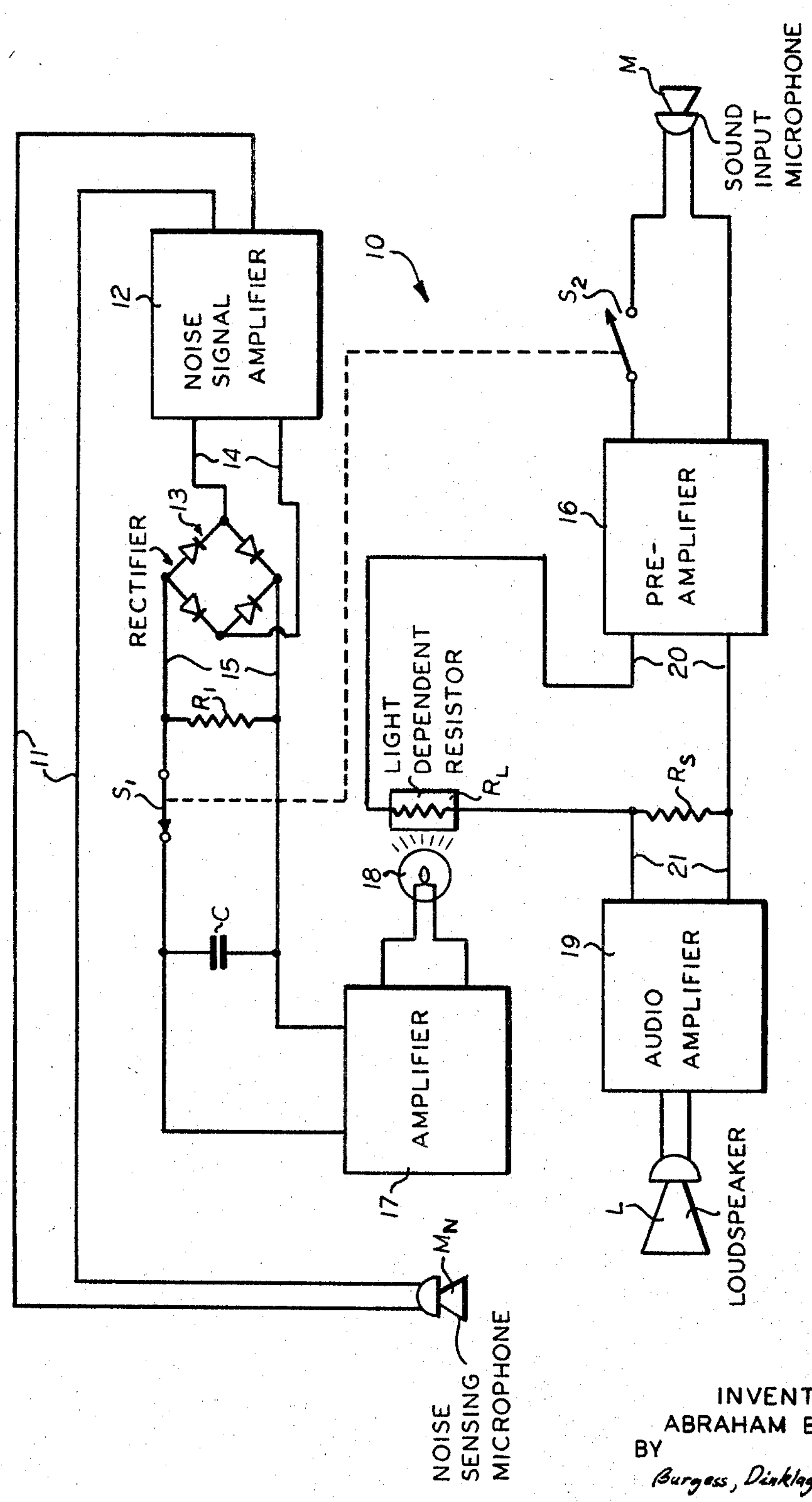
FIG. 1 is a schematic illustration of an elementary embodiment of the noise controlled sound system according to the invention.

Referring now to FIG. 1, which shows a simplified sound system 10 embodiment of the invention wherein a conventional microphone $M_N$, disposed in the listening area covered by the loudspeaker L is used for sensing audible noise thereat, and generates an electrical signal corresponding to said noise. This noise signal is transmitted via the lines 11 to the input of an amplifier 12 for amplification and to isolate the microphone $M_N$ from loading by the subsequent circuitry. The output signal of the amplifier 12, which has a complex AC wave shape, is applied to the input of the rectifier 13 via the lines 14. The rectifier 13 converts this complex wave noise signal into a pulsating DC signal which is applied to the resistor $R_1$ and capacitor C through the lines 15 and switch $S_1$ for filtering and conversion into a more slowly fluctuating DC signal. A shown in FIG. 1, the switch $S_1$ is in the position corresponding to the noise sensing, or listening mode of the system 10. Another switch, $S_2$, is interlockingly coupled to the switch $S_1$ so that when it is desired to transmit sound through the system 10, the switch $S_2$ is closed, connecting the sound input microphone M to the pre-amplifier 16, and opening the switch $S_1$ so as to interrupt the flow of noise level information to said system 10.

With the switch $S_1$ closed, the filtered DC signal which is representative of the noise level at the microphone $M_N$, is continuously applied to the input of an amplifier 17 having a lamp 18 load in its output circuit. The amplifier 17 can be a conventional amplifier, such as is used in a vacuum tube voltmeter (VTVM) or any other suitable type, preferably one which provides substantial load isolation. Since the lamp 18 functions to provide an illumination of an intensity representative of the noise signal at the input of the amplifier 17, any suitable lamp 18 such as an incandescent type can be used.

A light dependent resistor $R_L$ is disposed so as to be responsive to the illumination of the lamp 18, and has a resistance which decreases with increasing illumination intensity. Since through the action of the amplifier 17, the lamp 18 will have an illumination intensity which increases with noise level, the net effect of an increase in noise level produces a decrease of resistance in the light dependent resistor $R_L$.

The light dependent resistor $R_L$ and a resistor $R_S$ are connected in series and to the output of the preamplifier 16 and input of the audio amplifier 19 via the lines 20 and 21 respectively, so as to form a voltage divider attenuator network which attenuates sound signals flowing from the pre-amplifier 16 output to the audio amplifier 19 input, when the switch $S_2$ is closed.

This attenuation factor is solely dependent upon the resistance values of $R_L$ and $R_S$, and is given by the formula:

$$K=\frac{R_S}{R_S+R_L}$$

where

K is the attenuation factor, which represents the ratio of the pre-amplifier 16 output voltage to the audio amplifier 19 input voltage, and;

$R_S$, $R_L$ are the resistance values of their respective resistors.

The operation of the system 10 is best explained by considering the switches $S_1$ and $S_2$ to be initially in the positions shown in FIG. 1. In this condition the attenuation factor K will be continuously varied as a function of noise level, although no audio signal will actually be attenuated because $S_2$ is open.

When it is desired to transmit sound such as for example, speech through the system 10, the switch $S_2$ is closed and the microphone M is connected to the pre-amplifier 16, with the switch $S_1$ being opened. At the instant that switch $S_1$ is opened, the capacitor C is charged to a voltage corresponding to the noise level existing at the instant before opening said switch $S_1$, and with the resistor $R_1$ being disconnected from said capacitor C, and no other discharge path being provided in the amplifier 17, the capacitor C operates as a memory element, to provide an audio signal attenuation factor which is locked to the noise level existing immediately prior to the initiation of sound transmission, and remains locked until the sound transmission is interrupted by opening the switch $S_2$.

If the interlocked switches $S_1$ and $S_2$ are actuated by means responsive to sound inputs at the microphone M (not shown), such as for example is provided by conventional voice controlled microphone devices, the output level of the loudspeaker L can be made to follow variations in listening area noise level quite closely, as the attenuation network of $R_L$ and $R_S$ will be controlled by more recent noise information. This modification to the system 10 of FIG. 1 can be highly desirable, particularly in situations where the noise level increases during the course of sound transmission, as for example in the case of a crowd responding audibly to an announcement. With sound responsive switching, at each pause in transmission, the attenuation factor would be updated.

It is not absolutely necessary that the switches $S_1$ and $S_2$ be interlocked to inhibit adjustment of the attenuation factor during sound transmission, and if desired the switches $S_1$ and $S_2$ can be independently operable, or the switch $S_1$ can be replaced with a jumper (not shown) so that the output level at the loudspeaker L is continuously adjusted in response to the noise level. In such a case the noise sensitive microphone $M_N$ should be one having limited directional response and be oriented and/or disposed so as to avoid saturation of the attenuation control loop by sounds emanating from the loudspeaker L. Because the noise signal input to the amplifier 17 is a slowly fluctuating DC voltage, the aforesaid continuous attenuator control during sound transmission would produce no undesirable modulation effect.

It is understood that the schematic illustration of an embodiment of the invention shown by way of example in FIG. 1 may be varied as to the arrangement of the various elements thereof and in the choice of particular components as would be obvious to those skilled in the art.

For example, the pre-amplifier 16 and noise signal amplifier 12 can be omitted and the sound input microphone M and switch $S_1$ connected directly to the lines 20, with the noise input microphone $M_N$ being connected directly to the rectifier 13, where microphones $M_N$ and M having suitable output characteristics are used. Also, the input lines 20 to the variable attenuator network of $R_L$ and $R_S$ can be connected directly to the microphone M, where the audio amplifier 10 is of a type which requires no pre-amplification.

While the rectifier 13 is illustrated as a bridge rectifier, other rectifier types such as the full wave, or even half-wave can be substituted, if desired.

As is well known to those skilled in the art, the attenuation factor response to a given noise input at the microphone $M_N$ is established by the overall transfer function of the elements in cascade from said microphone $M_N$ to the lamp 18, which can be varied as desired to give a specific attenuation factor-noise level characteristic.

The amplifier 17 should be of a type which responds to low frequency input signals, and preferably a D.C. amplifier, and should have a relatively high, and preferably infinite input impedance, so as to retain the noise reference signal on the capacitor C when the switch $S_1$ is opened. Otherwise, the capacitor C would discharge through the input circuit of the amplifier 17 during the course of sound transmission with said switch $S_1$ open, and create a system 10 response which would be based upon false noise information, i.e. voltage decay across capacitor C would represent a decreasing noise level.

As can readily be noted from FIG. 1, the electro-optical method of attenuation control is relatively simple, inexpensive, and is not subject to any feedback from the light dependent resistor $R_L$ to the lamp 18. However, if desired, the combination of the lamp 18 and light dependent resistor can be replaced by an equivalent servo driven potentiometer (not shown) which responds to the output of the amplifier to vary the potentiometer in a manner analogous to the variation of the resistance of $R_L$ by the lamp 18 illumination.

By using a light dependent resistor $R_L$ which has an appropriate resistance-illumination characteristic, and a suitable value of resistance for $R_S$, the system 10 can be set to provide a loudspeaker L output which is maintained at a predetermined decibel level above the noise in the listening area. If desired, an additional adjustment of the attenuation factor can be provided, as for example, to aid in initial calibration of the system 10, by using a variable resistor for $R_S$ (not shown) in lieu of the fixed resistor shown in FIG. 1. Since the pre-amplifier 16 and audio amplifier 19 contemplated are conventional sound system components, which can have their own gain controls (not shown), these controls can be utilized to establish an initial loudspeaker output level for a given sound input to the microphone M.

As is well known in the electronics art, the output of the rectifier 13 is in general, a series of D.C. pulses, in the absence of the capacitor C. To provide an input signal to the amplifier 17 which is more representative of the noise level as would be sensed by a listener, the capacitance and resistance values of C and $R_1$, which together act as a filter, are chosen so that the signal applied to amplifier 17 represents the envelope of the peaks of the D.C. pulses derived by rectification of the noise signal. Since the response of the capacitor C input filter ($R_1$ and C in shunt) is quite sensitive to the effect of series resistance (not shown) which is inherent in the real diodes used in the rectifier 13, no actual values are given herein, except that the time constant $\gamma$, which is given by the formula $\gamma = R_1C$, must be larger than the width of the D.C. pulses, in order to provide a noise signal input to amplifier 17 which approximates the peak envelope of these D.C. pulses.

In a given application of the system 10 according to the invention, the actual values of the capacitor C and resistor $R_1$ can be established by routine computation, taking into account the resistance parameters of the actual rectifier 13 used.

Figure 2:
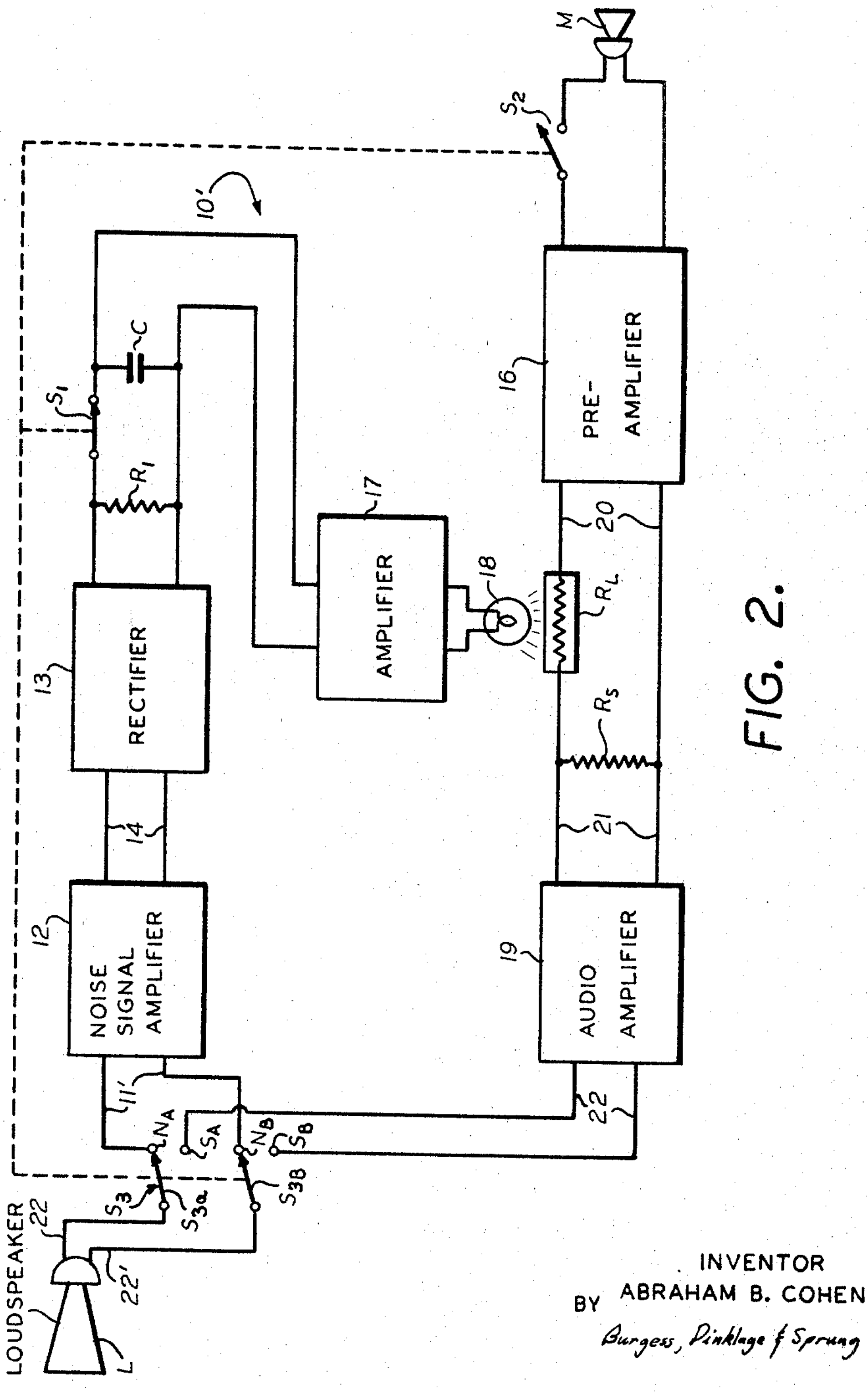
FIG. 2 is a schematic illustration of a preferred embodiment of the invention wherein switching circuitry is provided to enable the loudspeakers used for sound reproduction to be also used for sensing noise.

In FIG. 2, a noise controlled sound system 10′, which is a perferred embodiment of the basic invention of FIG. 1, is provided with an additional switch $S_3$ so that the loudspeaker L can be used as a noise sensing transducer, when not being used for sound reproduction. Although $S_3$ is illustrated as a double-pole, double throw switch, it is understood that a single-pole, double throw switch can be substituted where one of the loudspeaker leads 22, or 22′ is connected to a common system 10′ ground. With this substitution, the ungrounded lead 22 would be connected to the arm $S_{3A}$ and the arm $S_{3B}$ would be omitted along with its associated contacts $N_B$ and $S_B$.

The switches $S_1$, $S_2$ and $S_3$ can be interlocked as shown by way of example in FIG. 2, or separately operable as desired. However, it is preferable to use interlocked switches $S_1$, $S_2$ and $S_3$.

The operation of the system 10′ is basically similar to that of the system 10, previously described, the basic distinction being that when the switch $S_2$ is open, as in the case where no sound is to be transmitted, the switch $S_3$ connects the loudspeaker 10 to the input line 11′ of the noise signal amplifier 12 via the switch arms $S_{3A}$ and $S_{3B}$ and contacts $N_A$ and $N_B$ in the position shown in FIG. 2, with the switch $S_1$ being closed. When it is desired to transmit sounds through the system 10′, the switch $S_2$ is closed, switch $S_1$ is opened, and switch $S_3$ is switched to the other position provided, so that the arms $S_{3A}$ and $S_{3B}$ are connected to the contacts $S_A$ and $S_B$ respectively, and the audio amplifier 19 output lines 22 are operatively connected to the loudspeaker L.

In this particular embodiment, when the system 10′ is in the aforesaid sound transmission mode, the switch $S_1$ is opened to prevent the capacitor C from discharging through resistor $R_1$, since with the loudspeaker L switched to the audio amplifier 19 output, there is no noise signal to maintain a continuous charge voltage across the capacitor C as in the embodiment of FIG. 1. Therefore, in order to provide an input reference noise signal to the amplifier 17 for maintaining the proper attenuation factor, the capacitor C must not be discharged, to any substantial extent during sound transmission, since it functions as a noise level memory element.

Figure 3:
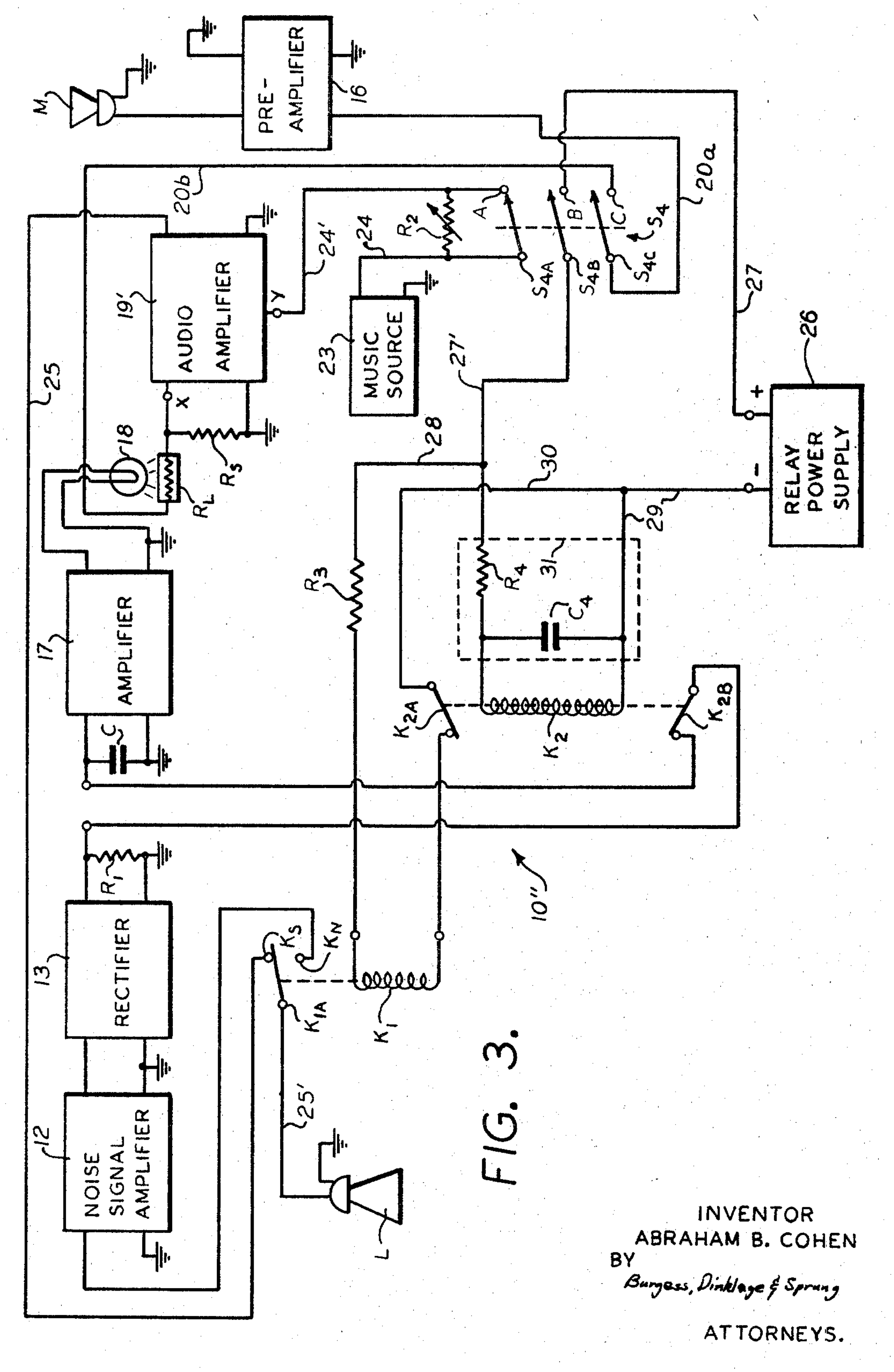
FIG. 3 is a schematic illustration of a further embodiment of the invention, basically similar to that of FIG. 2, but adapted to reproduce sounds from two separate sources.

The basic invention may be further modified as shown in FIG. 3 to provide for the transmission of sounds from a second source, such as a music source 23, which can be a tape recorder, phonograph, or even a second microphone (not shown). In the circuit configuration illustrated in FIG. 3, the system 10″ is transmitting sound signals from the music source 23, for reproduction at the loudspeaker L via the dual-input audio amplifier 19′.

In this mode of operation, sound signals from the music source 23 are applied directly to the input Y of the amplifier 19′ via the lines 24 and 24′ and arm $S_{4A}$ of the switch $S_4$, which short-circuits the variable resistor $R_2$. Loudspeaker L is operatively connected to the output of the amplifier 19′ via the lines 25 and 25′ and arm $K_{1A}$ of the relay $K_1$ which engages the contact $K_s$ thereof.

When it is desired to transmit sounds via the microphone M, as for example, to make an announcement, the switch $S_4$ is depressed to break contact between its arm $S_{4A}$ and contact terminal A, and simultaneously to make contact between its arms $S_{4B}$ and $S_{4C}$ and their respective contact terminals B and C.

The opening of the arm $S_{4A}$ places the resistance of the resistor $R_2$ in series with the signal from the music source 23, thereby dropping the level of the music signal. If desired, the resistor $R_2$ can be omitted, so as to cause the music to be completely cut off during transmission through the microphone M. In cases where it is desired merely to reduce the music level during announcements, the resistance of the variable resistor $R_2$ can be adjusted to produce a desired background music level, the exact resistance of $R_2$ necessary for a given music level being determined by the input impedance provided at input $\gamma$ of amplifier 19′.

The connection of arm $S_{4C}$ to its associated contact C connects the microphone M output signal, amplified by the pre-amplifier 16, to the light dependent resistor $R_L$ via the lines 20_a_ and 20_b_.

The connection of the arm $S_{4B}$ to its associated contact B, initiates a switching sequence in the relays $K_1$ and $K_2$ which causes the system 10″ to be placed in a noise listening mode for a predetermined period of time and then, with the attenuation factor corresponding to the noise level existing at the end of this period locked in via the memory function of capacitor C, the system 10″ is switched to the microphone M transmission mode, and remains so until switch $S_4$ is released and the arm $S_{4B}$ opens.

A power supply 26, for example, a battery (not shown) is connected to energize the coils of relays $K_1$ and $K_2$ via the lines 27 and 27′, 28 and arm $S_{4B}$ of the switch $S_4$, and the lines 29 and 30.

When the arm $S_{4B}$ is initially closed, the positive side of the power supply 26 is connected to one end of the coil of $K_1$ through the resistor $R_3$ and to one end of the coil of $K_2$ through the resistor $R_4$. The negative side of power supply 26 is connected directly to the other end of the coil of $K_2$ by the lines 29, and to the onter end of the coil of $K_1$ through the normally closed arm $K_{2A}$ of relay $K_2$ via the line 30. A time delay network 31, comprising the resistor $R_4$ and shunt capacitor $C_4$ is provided to delay the operation of relay $K_2$ until a predetermined time after $S_4$ has been depressed. The power supply 26 has an output voltage which is somewhat greater than the nominal operating voltage of the relays $K_1$ and $K_2$, for reasons which will shortly become obvious.

When switch $S_4$ is initially depressed, relay $K_1$ is energized and operates with a speed substantially established by the time constant of its coil inductance and total series resistance including $R_3$. At the instant when relay $K_1$ operates, and its arm $K_{1A}$ switches the loudspeaker L output line 25′ to the contact $K_N$ to drive the noise signal amplifier 12 (noise listening mode), the relay $K_2$ has not yet operated, and thus its normally closed arms $K_{2A}$ and $K_{2B}$ respectively cause the relay $K_1$ to hold the loudspeaker L connected to the noise amplifier 12, and the microphone M sound signal attenuation factor to be continuously adjusted via the light dependent resistor in response to the level of the noise sensed by said loudspeaker L.

The resistance and capacitance values of the resistor $R_4$ and capacitor $C_4$ are selected in relation to the resistive and inductive properties of the coil of relay $K_2$ so as to delay the operation of said relay $K_2$ for a predetermined period, 250 milliseconds, for example after relay $K_1$ operates so as to provide an initial period of time wherein the system 10″ can sense the listening area noise level and respond thereto to establish an appropriate attenuation factor. At the end of this 250 millisecond period, relay $K_2$ operates to open its arms $K_{2A}$ and $K_{2B}$, thereby respectively de-energizing relay $K_1$ and thus causing loudspeaker L to be switched back to the output of audio amplifier 19′, and opening the series connection between rectifier 13 and capacitor C, thus causing the attenuation factor to be locked to the value which corresponds to the noise level existing at the end of the 250 millisecond period, and to remain so locked until switch $S_4$ is released, as at the end of transmission through microphone M.

Since in the particular time delay network 31, shown by way of example in FIG. 3, resistor $R_4$ is connected in series with the coil of relay $K_2$ and capacitor $C_4$, the power supply 26 must have a sufficient output voltage to permit the required current to flow through the coil of relay $K_2$ for operating it. Thus, the power supply 26 output voltage must be sufficient to withstand the voltage drop in resistor $R_4$. Also, resistor $R_4$ must have sufficient power dissipation capability to withstand both the steady state current passed through it, and the initial surge current, since the capacitor $C_4$ acts as a temporary short-circuit when the power supply 26 voltage is initially applied.

So that relays $K_1$ and $K_2$ of substantially similar operating voltage ratings can be used, the series resistor $R_3$, which has substantially the same resistance as the resistor $R_4$ is provided. However, if desired, the relay $K_1$ can be selectetd so as to have an operating volage rating equal to that of the power supply 26, thus eliminating the need for $R_3$ which is omitted. In such a case, the relay $K_2$ is selected so as to have an operating voltage lower than that of $K_1$, taking into account the steady state voltage drop across resistor $R_4$, which is used for time delay purposes.

It is understood that the specific time delay network 31 shown in FIG. 3 is by way of example only, and is by no means the only type which can be used in the invention. Other types of time delay devices (not shown) such as motor driven switches, thermal delay switches having contacts which operate in response to the heating of a resistor, etc. can be substituted. Where such types of time delay devices are used to control the operation of relay $K_2$, relay $K_1$ can be operated directly from the power supply 26, omitting $R_3$, with the combination of $R_4$ and $C_4$ being replaced by the particular time delay device used.

As is well known to those skilled in the art, relay switching circuits, as well as other electrical networks have duals, i.e. circuits which although different in the arrangement and selection of elements, can operate to perform the same functions as a given specific circuit. Therefore, any circuit arrangement which is the dual of the specific switching arrangement shown in FIG. 3 can be used, provided that it causes the loudspeaker L to be switched from the output of the audio amplifier 19′ to the input of the noise signal amplifier 12, and to remain connected thereto for a given period of time, and at the end of said period to be switched back to the output of the audio amplifier 19′, with the capacitor C being connected to the rectifier 13 and resistor R at least during the time when the loudspeaker L is connected to the input of the noise signal amplifier 12, and preferably prior thereto, and said capacitor C being disconnected from said rectifier 13 and resistor R when the loudspeaker L is switched back to the audio amplifier 19′ output. At the end of transmission through microphone M, the system 10″ is restored to the switching configuration which existed prior to the initiation of the noise listening mode, with the transmission of background music being resumed, or raised in output level.

Figure 4:
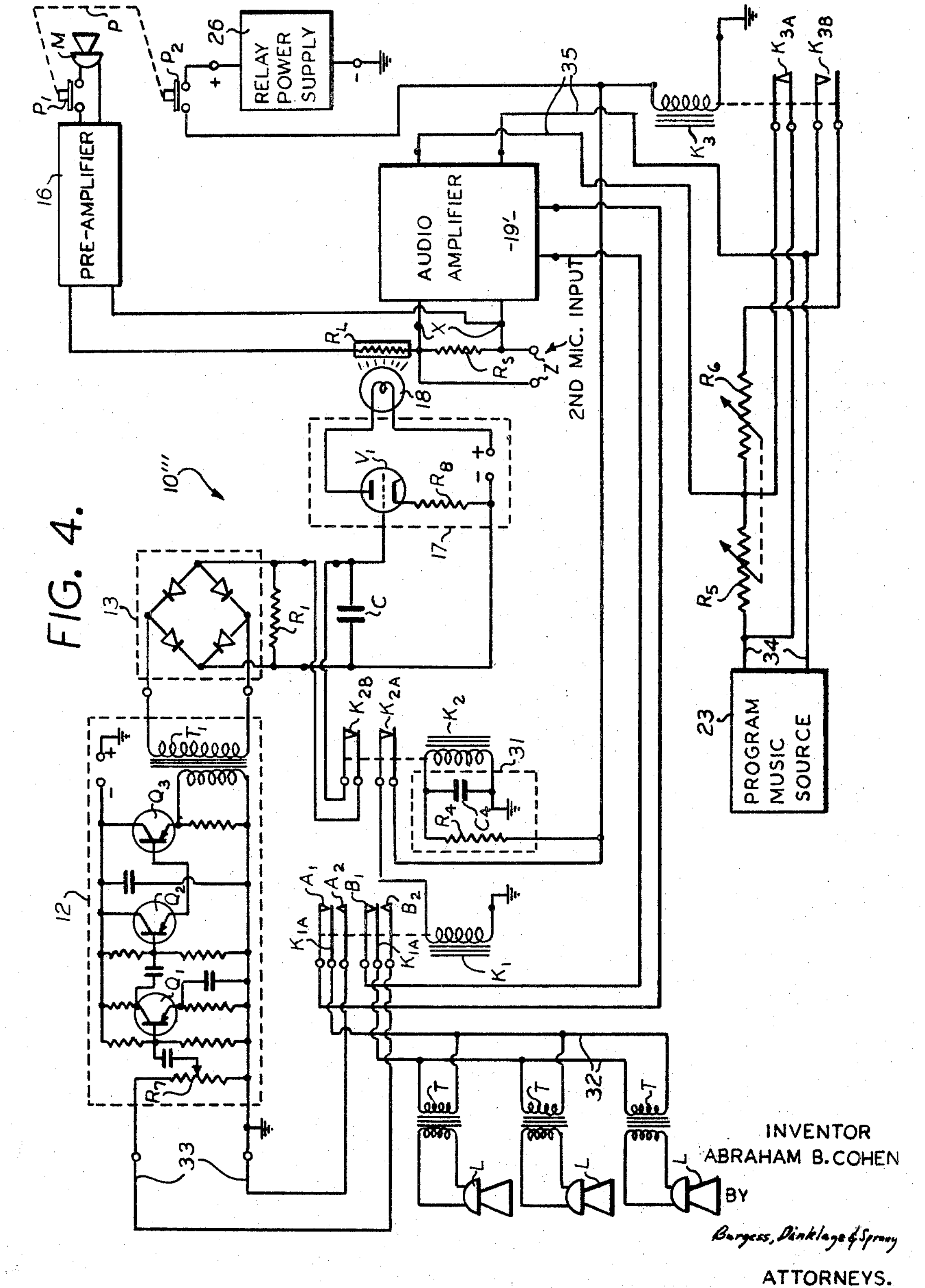
FIG. 4 is a schematic illustration of another embodiment of the invention, similar in certain respects to that of FIG. 3, but having a plurality of loudspeakers.

The embodiment of the invention illustrated by the system 10‴ of FIG. 4 has been actually reduced to practice, and includes the features of the system 10″ of FIG. 3 with modifications to permit the use of a plurality of loudspeakers L for both sound distribution and noise level sensing.

As shown in FIG. 4, the system 10‴ is in the initial program music transmission mode, with music signals from the program music source being transmitted for reproduction at the loudspeakers L, so as to provide background music in the listening areas covered by said loudspeakers L. In this mode each of the relays $K_1$, $K_2$ and $K_3$ are de-energized so that the output of the audio amplifier 19′ is delivered to each of the loudspeakers L coupled to the speaker lines 32 via their individual matching transformers T. Relay $K_1$ provides for switching the speaker lines 32 between the output of the amplifier 19 and the input of amplifier 12, so that when said relay $K_1$ is energized the lines 32 are connected to the input of amplifier 12 via the normally open arm and contact pairs $K_{1A}$ and $A_2$ and $K_{1B}$ and $B_2$, and the lines 33. In the de-energized state the arm and contact pairs $K_{1A}$ and $A_1$ and $K_{1B}$ and $B_1$ on relay $K_1$ are normally closed so that the loudspeakers are operatively connected to the output of amplifier 19.

In this particular embodiment of the invention, for purposes of example, the resistor $R_3$ in series with the coil of relay $K_1$ in the embodiment of FIG. 3 is omitted, and consequently, for the reasons previously given $K_1$ is selected to operate with the full voltage of power supply 26, with $K_2$ being selected to operate with a somewhat lesser voltage by reason of its time delay network 31 having the series resistor $R_4$. Actually, placing a resistance in series with the coil of a relay increases its operating response time, as is well known in the art. Thus, as in the embodiment of FIG. 3, the effect of resistor $R_3$ must be taken into account in the selection of resistor $R_4$ and capacitor $C_4$ in order to obtain a desired delay between the operation of relays $K_1$ and $K_2$. Therefore, in the embodiment of FIG. 4, the time constant of $R_4$ and $C_4$ can be somewhat less to produce the same delay.

Relay $K_2$ is provided with two sets of normally closed contacts $K_{2A}$ and $K_{2B}$ which when $K_2$ operates, respectively open the coil current supply to relay $K_1$, and the connection between $R_1$ and C, as in the embodiment of FIG. 3.

Relay $K_3$ is provided with a normally closed set of contacts, $K_{3A}$, and a normally open set of contacts, $K_{3B}$, which function to reduce the level of background music during transmissions through microphone M, via the variable resistors $R_5$ and $R_6$. When relay $K_3$ is de-energized, signals from the program music source 23 are applied directly to the input terminals Y of the dual-input audio amplifier 19′, with resistor $R_5$ being short-circuited by the closed contacts $K_{3A}$. When relay $K_3$ is energized and operates, contacts $K_{3A}$ are opened, and contacts $K_{3B}$ are closed, thereby connecting the output lines 34 of the program music source 23 across $R_5$ and $R_6$ in series, and the input lines 35 which connect with the terminals Y on amplifier 19′ are connected across $R_6$, so that the music signals are attenuated by a factor F which is given by the formula:

$$F=\frac{R_6}{R_5+R_6}$$

where $R_5$ and $R_6$ are the resistance values of their respective resistors $R_5$ and $R_6$. As shown, the resistors $R_5$ and $R_6$ are variable resistors which are operatively connected to each other, or gang operated so that a substantially constant load is presented to the program music source regardless of the value of the attenuation factor F. As is well known in the art, this particular result can be obtained by connecting the resistance adjustment shafts (not shown) so that when $R_5$ has a maximum resistance, $R_6$ has a minimum resistance and vice versa.

In this particular embodiment of the invention, only one switch, the two-section press-to-talk switch P, having sections $P_1$ and $P_2$, need be manually operated in order to transmit sound signals through the microphone M, and cause the system to drop the level of background music, and examine the noise level to adjust the output of loudspeakers L.

When it is desired to transmit through the microphone M, switch P is depressed, closing both sections $P_1$ and $P_2$ substantially simultaneously. The closure of $P_1$ connects microphone M to the input of the pre-amplifier 16. The closure of $P_2$ connects the relay power supply 26 to energize relays $K_1$, $K_2$ and $K_3$.

As long as the switch P is depressed, relay $K_3$ operates and remains energized to hold the attenuator circuit of $R_5$ and $R_6$, thereby reducing the music signal input, until said switch P is released.

When relay $K_1$ is energized, it operates, and remains energized until relay $K_2$ operates, at which time contacts $K_{2A}$ on relay $K_2$ open to de-energize relay $K_1$.

The operation of relays $K_1$ and $K_2$ is essentially similar to that in the system 10″ of FIG. 3, and can be briefly summarized as follows:

(1) Relay $K_1$ operates first and switches the loudspeaker L to the input of amplifier 12 to provide a noise signal which approximately represents the average of the highest noise level sensed among said loudspeakers L.

(2) The attenuation factor produced by the light dependent resistor $R_L$ and the resistor $R_S$ is continuously varied in response to said noise level, so that the output of the loudspeakers L will be above the level of noise.

(3) After a period of delay established by $R_4$ and $C_4$ in combination with the coil of relay $K_2$, the relay $K_2$ operates and thus opens the $K_{2B}$ contacts connecting $R_1$ and C, to establish a reference noise signal input to amplifier 17, and opens the contacts $K_{2A}$ to de-energize relay $K_1$, thereby causing the loudspeakers L to be returned to the output of audio amplifier 19′ so as to reproduce the sound signals transmitted through the microphone M.

By way of example, specific details as to the construction of the noise signal amplifier 12 and the amplifier 17 are given in FIG. 4. In each case, it is assumed that the amplifiers 12 and 17 are provided with suitable power supplies (not shown) of conventional construction, and that means for heating the cathode of tube $V_1$ in amplifier 17 is also provided.

The noise signal amplifier 12 can be constructed as a two-stage transistorized unit with the first stage being the circuitry associated with transistor $Q_1$, and the second stage comprising transistors $Q_2$ and $Q_3$ and associated circuitry arranged in the conventional "Darlington" configuration. An adjustable input gain control $R_7$ potentiometer is provided for the first stage, and the output of the second stage is taken from a transformer $T_1$.

The amplifier 17 can be of simple construction, having a single triode tube $V_1$, a cathode bias resistor $R_8$, and a resistive plate circuit load, the lamp 18. If expedient because of the characteristics of the tube $V_1$, an additional resistance can be inserted in series with the lamp 18, it being understood that in such case, the illumination of lamp 18 will be reduced, and will represent only a substantially fixed fraction of the actual noise level. Alternatively, a plurality of lamps 18 (not shown) can be connected in series to accommodate the characteristics of the tube $V_1$, in cases where a single lamp 18 of suitable resistance is not available. The cathode bias resistor $R_8$ can be chosen to provide a specific threshold noise signal response in lamp 18, if desired.

Of course, other types of amplifiers, suitable for the purposes of the invention, and compatible with the other components can be substituted, if desired.

Figure 5:
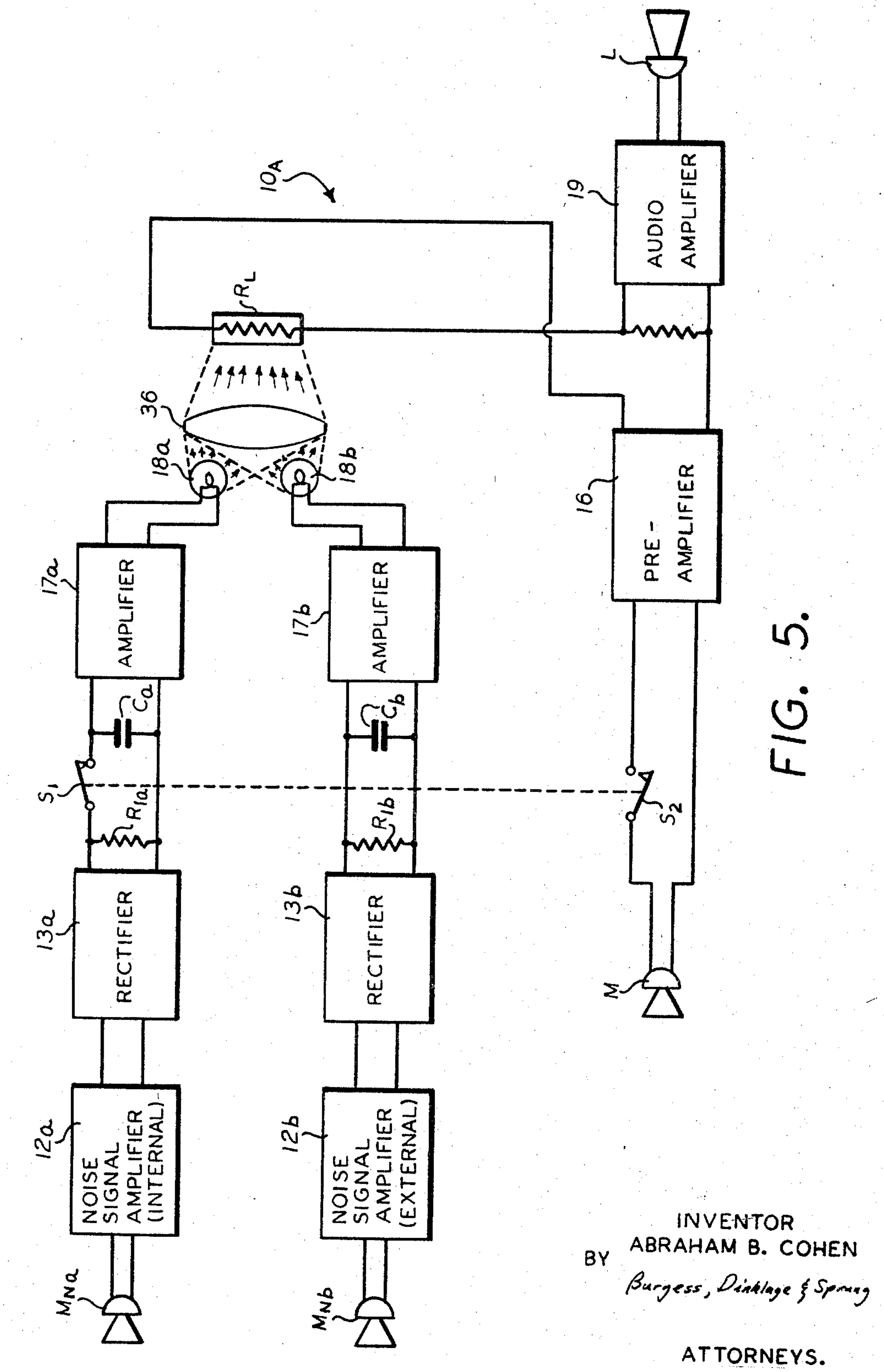
FIG. 5 is a schematic illustration of still another embodiment of the invention which provides a noise controlled sound system responsive to a plurality of noise inputs.

FIG. 5 shows a further embodiment of the invention wherein the output level of sound signals transmitted through the microphone M and reproduced at loudspeaker L can be controlled in response to the noise level sensed by two distinct transducers, such as the microphones $M_{Na}$ and $M_{Nb}$. Such a system is represented by the system 10A wherein two channels of noise control are provided, one being provided to adjust the attenuation factor (produced by the single light dependent resistor $R_L$ and the resistor $R_S$) in response to noise sensed at an internal listening area, with the other being provided for adjusting the attenuation factor in response to noise sensed at an external listening area. This particular system $\mathbf{10_A}$ is advantageous in situations where it is desired to reproduce sound in a building which is located in an area where highly variable exterior noise levels exist, such as in buildings near railroads, airports, construction sites, etc. Under such conditions, it can be desirable to maintain the sound reproduction level within the building at a related level above internal noise, and yet provide means for automatically raising it temporarily during the transmission of an announcement through microphone M, if a high level of exterior noise suddenly occurs. While a single channel of noise control may suffice for coverage of areas near the loudspeaker L, in many cases would be inadequate for coverage of areas at the boundary of such a building. Therefore, the system 10A provides means for optically mixing noise level information obtained from two distinct sources to provide a single resultant audio attenuation factor which is representative of the composite noise level picture.

Accordingly, one noise sensing channel comprising microphone $M_{Na}$, noise signal amplifier 12*a*, rectifier 13*a*, resistor $R_{1a}$, capacitor $C_a$, switch $S_1$, amplifier 17*a*, and lamp 18*a*, interconnected as shown in FIG. 5 is provided for the internal noise level adjustment component, and the other channel comprising microphone $M_{Nb}$, amplifier 12*b*, rectifier 13*b*, resistor $R_{1b}$, capacitor $C_b$, amplifier 17*b*, and lamp 18*b* is provided for the external noise level adjustment component.

As can readily be seen, each of these noise sensing channels is basically similar to that provided in the embodiment of FIG. 1, with the exception that no switching means is provided between $R_{1b}$ and $C_b$, thus the external noise sensing channel is continuously operating to adjust the attenuation factor via lamp 18*b* and light dependent resistor $R_L$, and hence is an unlocked channel. Switch $S_1$ which is operatively connected so as to be actuated simultaneously with switch $S_2$, provides means for locking a fixed attenuation factor component which corresponds to the noise level sensed by $M_{Na}$ at the instant that switch $S_2$ is closed for transmission through microphone M.

An optical mixer 36, such as a lens, prism, etc., gathers the light emitted by lamps 18*a* and 18*b* and focuses it upon the light dependent resistor $R_L$. Since the light dependent resistor $R_L$ responds to the total light intensity which it receives, to produce an audio signal attenuation factor, and the illumination intensity of each lamp 18*a* and 18*b* represents the noise level at the microphones $M_{Na}$ and $M_{Nb}$ respectively, the resultant attenuation factor will be a function of the sum of the internal and external noise levels, up to the saturation limit of the resistor $R_L$. Thus, the system 10A provides a dual noise level control which automatically adjusts its audio signal attenuation factor so as to maintain the sound reproduction level at a value which is effective to overcome both internal and external noise.

If desired, loudspeakers (not shown) can be substituted for either or both of the microphones $M_{Na}$ and $M_{Nb}$, with appropriate switching circuitry being provided as in the previously described embodiments of the invention.

What is claimed is:

1. A noise controlled sound reproducing system which comprises:

(a) An audio signal source which produces electrical signals representing the sounds to be reproduced;

(b) An audio amplifier operatively connected to said audio signal source and responsive thereto to amplify signal inputs therefrom;

(c) At least one loudspeaker disposed in a listening area, said loudspeaker being operatively connected to the output of said audio amplifier to be driven thereby;

(d) A noise signal source which produces electrical signals representing the noise in said listening area;

(e) Signal conversion means, including a lamp and connected to said noise signal source for response to the signals thereof to vary the illumination intensity of said lamp in accordance with the noise level in said listening area as indicated by said signals;

(f) A variable attenuator, including a light-dependent resistor exposed to said lamp for illumination thereby, said attenuator being connected to the input of said audio amplifier and connected to said audio signal source to transmit the signals thereof to said audio amplifier for amplification thereby, and to attenuate such signals transmitted by a factor which corresponds to the intensity of illumination at said light-dependent resistor, and hence to the noise level in said listening area, said attenuator having a continuous attenuation factor characteristic independent of the level of the signals from said audio signal source to provide less attenuation with increasing noise level, whereby the loudspeaker sound output is maintained at a level above that of the noise in the listening area;

(g) means responsive to said audio signal source, adapted to adjust the attenuation factor produced by said variable attenuator in response to noise sensed in the absence of audio signals from said source, and due to the presence of audio signals from said source, maintaining said attenuating factor at a value which corresponds to the most recent noise level sensed in the absence of such audio signals.

2. A noise controlled sound reproducing system which comprises:

(a) A first noise signal source;

(b) A second noise signal source;

(c) A first rectifier having an output load resistor, said rectifier being operatively connected to rectify signals from said first noise signal source;

(d) A second rectifier, also having an output load resistor, said rectifier being operatively connected to rectify signals from said second noise signal source;

(e) A first amplifier having an input shunt capacitor, and a lamp output load, said amplifier being responsive to rectified noise signals from the first source to produce a lamp illumination intensity corresponding thereto;

(f) A second amplifier also having an input shunt capacitor and a lamp output load, said amplifier being responsive to rectified noise signals from the second source to produce a lamp illumination intensity corresponding thereto;

(g) Optical means for combining and focusing the light emitted by the lamp loads of said first and second amplifiers;

(h) A light-dependent resistor, disposed so as to be responsive to the light produced by said lamps as focused and combined by said optical means;

(i) An audio signal source operatively connected to said light dependent resistor;

(j) An audio amplifier having a loudspeaker output load;

(k) A second resistor connected in series with said light-dependent resistor, said second resistor also being connected to said audio signal source and said audio amplifier so as to form a resistive voltage divider attenuator network with said light-dependent resistor for attenuating audio signals passing therethrough to the audio amplifier by a factor established by the resistances of said second resistor and the light-dependent resistor, whereby the output level of the loudspeaker is adjusted in response to the noise represented by the combined signals from said noise signal sources so as to maintain the level of the sound reproduced by said loudspeaker in relation thereto;

(l) means responsive to said audio signal source, adapted to adjust the attenuation factor produced by said variable attenuator in response to noise sensed in the absence of audio signals from said source, maintaining said attenuating factor at a value which corresponds to the most recent noise level sensed in the absence of such audio signals.

3. A noise controlled sound reproducing system which comprises:

(a) An audible noise sensing transducer which produces an electrical signal in response to ambient noise;

(b) A rectifier responsive to said transducer to rectify said noise signal;

(c) A load resistor connected in shunt across the output of said rectifier;

(d) An isolation amplifier having a pair of input terminals and a pair of output terminals;

(e) A capacitor connected in shunt across the input terminals of said isolation amplifier;

(f) A first switch operatively connected to said load resistor and said capacitor for selectively connecting said rectifier output, load resistor, capacitor, and isolation amplifier input terminals in shunt;

(g) A lamp operatively connected to the output terminals of said isolation amplifier, said lamp being illuminated in response to the output signal thereof;

(h) An audio amplifier having a pair of output terminals and a pair of input terminals;

(i) A loudspeaker operatively connected to the output terminals of said audio amplifier;

(j) An input resistor connected in shunt to the input terminals of said audio amplifier;

(k) A light dependent resistor operatively connected in series to one input terminal of said audio amplifier, said light dependent resistor being disposed so as to be illuminated by said lamp;

(l) A sound input transducer having a pair of output terminals, one of which is connected to the other input terminal of said audio amplifier;

(m) A second switch operatively connected to said light dependent resistor and to the other output terminal of said sound input transducer, said second switch being operatively connected to the first switch so that when the second switch is open, the first switch is closed, and that when said second switch is closed, the first switch is open whereby when said second switch is open the rectified noise signal is applied to the input of the isolation amplifier thereby causing the lamp to become illuminated with an intensity corresponding to the amplitude of said rectified noise signal, and the light dependent resistor to assume a resistance value corresponding to the lamp intensity, and hence related to the amplitude of said rectified noise signal.

4. The sound reproducing system of claim 3 wherein the loudspeaker is also the noise sensing transducer, and switching means are provided for selectively connecting said loudspeaker to respond to ambient noise and to respond to the output of said audio amplifier.

5. A noise controlled sound reproducing system which comprises:

(a) A first audio signal source;

(b) A second audio signal source;

(c) An audio amplifier responsive to said first and second audio signal sources;

(d) A continuously variable attenuator responsive to noise signals, said attenuator being operatively connected to said audio amplifier;

(e) At least one loudspeaker disposed in a listening area, said loudspeaker being responsive to audio signals from said audio amplifier to reproduce sounds corresponding thereto, and said loudspeaker being also responsive to noise in said listening area to generate electrical signals corresponding thereto;

(f) Noise signal processing means operatively connected to said attenuator so as to vary the attenuation of one of said audio signals as a function of noise level, said signal processing means including a noise signal memory element;

(g) A first switching means operatively connected to said loudspeaker and to said audio amplifier and noise signal processing means for selectively connecting said loudspeaker to the audio amplifier for reproducing sound, and to said noise signal processing means for supplying noise signals thereto;

(h) A second switching means operatively connected to said first switching means to control the operation thereof and connected to the memory element in said noise signal processing means to selectively activate and de-activate said memory element;

(i) A third switching means, operatively connected to said first switching means and to said second switching means to selectively initiate operation of both of them, said third switching means being connected to said audio amplifier and to said first and second audio signal sources for selectively applying to said audio amplifier the signals from said sources;

(j) Attenuation means operatively connected to said second audio signal source and to said third switching means to attenuate the signals from said second audio signal source when said third switching means applies to said audio amplifier the signals from said first audio signal source; and, (k) Time delay means operatively connected to said second switching means and responsive to said third switching means so that when said third switching means is actuated for reproduction of sounds from said first audio signal source, the first switching means operates to switch the loudspeaker to the noise signal processing means for a period established by said time delay means, and said second audio signal is attenuated by its associated attenuation means, and at the end of said time delay period, the second switching means is operated to cause the memory element to retain a noise signal representative of the noise level existing at the end of said delay period, with the first switching means responding to the operation of the second so as to switch the loudspeaker to the audio amplifier, whereby the actuation of the third switching means causes the system to listen to noise during said delay period, and adjust the continuously variable attenuator so that audio signals from the first source are reproduced at the loudspeaker with a level that exceeds that of the noise as determined via the memory element at the end of the delay period, with the reproduction of audio signals from the second source being attenuated during the reproduction of audio signals from the first source.

6. The sound reproducing system of claim 5 wherein:

(a) The memory element is a capacitor;

(b) The first and second switching means each include a relay;

(c) The time delay means includes a resistance-capacitance network; and (d) Power supply means are provided for operating the relays of the first and second switching means.

References Cited

UNITED STATES PATENTS

| | | | |
|---|---|---|---|
| 3,281,723 | 10/1966 | Mercer. | |
| 3,281,706 | 10/1966 | Morris et al. | 330—59 |
| 3,133,990 | 5/1964 | Seeley | 179—1.8 |
| 3,082,381 | 3/1963 | Morrill et al. | 330—59 |
| 3,014,550 | 12/1961 | Gales et al. | 179—1.7 |
| 2,657,264 | 10/1953 | Augstadt | 179—1.8 |
| 2,338,551 | 1/1944 | Stanko | 179—1.8 |

KATHLEEN H. CLAFFY, *Primary Examiner.*

R. P. TAYLOR, *Assistant Examiner.*